United States Patent

[11] 3,581,599

| [72] | Inventors | Arthur Lee<br>North Vancouver;<br>John C. Stainsby, South Burnaby, both of,<br>British Columbia, Canada |
|---|---|---|
| [21] | Appl. No. | 841,475 |
| [22] | Filed | July 14, 1969 |
| [45] | Patented | June 1, 1971 |
| [73] | Assignee | Skil Corporation(Canada) Ltd., Power Machinery Division<br>Richmond, Canada |

[54] THREAD-ON CONNECTING ROD AND CRANK ASSEMBLIES
8 Claims, 4 Drawing Figs.

[52] U.S. Cl. .................................................... 74/603,
308/179, 308/198
[51] Int. Cl. ........................................................ G05g 1/00,
F16c 3/06, F16c 43/00

[50] Field of Search............................................ 74/595,
596, 603; 308/179, 198

[56] References Cited
UNITED STATES PATENTS
2,248,615  7/1941  Frauenthal .................. 308/207

Primary Examiner—Martin P. Schwadron
Assistant Examiner—Frank Susko
Attorney—Fetherstonhaugh & Co.

ABSTRACT: A thread-on crank and connecting rod assembly and a crank for such an assembly, having a plurality of roller bearings located in a race constituted by the bearing surfaces of the crankpin and the big end of the connecting rod and in which the last few of the roller bearings are inserted through an axial opening in one of the crank webs.

PATENTED JUN 1 1971

3,581,599

INVENTORS
ARTHUR LEE
JOHN C. STAINSBY
BY
Featherstonhaugh & Co.
ATTORNEYS

THREAD-ON CONNECTING ROD AND CRANK ASSEMBLIES

BACKGROUND OF THE INVENTION

This invention is concerned with crank and connecting rod assemblies of the thread-on type and with cranks for such assemblies. In such an assembly the big end of the connecting rod is undivided and is threaded on to the crankpin either by having the big end large enough to pass over the crank web or by removing all or part of one of the webs or counterweights. Assemblies of this kind have generally cylindrical bearing elements (hereinafter referred to generically as roller bearings) located in a race constituted by the bearing surfaces of the big end and the crank pin bearing surface.

Assemblies of this general kind are shown in U.S. Pat. No. 1,383,292 issued July 5, 1921 to William Douglas and U.S. Pat. No. 3,164,423 issued Jan. 5, 1965 to Ernest Hatz et al.

The Douglas patent shows an arrangement in which the bearing surface of the connecting rod is formed as an annular groove to prevent axial movement of the roller bearing relative to the connecting rod. The last few of the roller bearings of the Douglas assembly are inserted axially through an opening in the connecting rod which is subsequently closed by a blocking or closing element which is riveted into position.

The Hatz patent shows short roller bearings supported in a cage, the bearings being inserted radially through a cutaway section of the big end of the connecting rod and a recess in the crank web, the recess being blocked subsequently to assembly by a fillet.

The expense and inconvenience of the two prior art devices is apparent. Douglas requires that a flat be formed on the crank web, an annular bearing surface with side flanges be formed in the big end and in the crank pin and a cutaway be made in the big end and that there be a closure piece for closing that cutaway when the assembly is completed.

The Hatz arrangement has each roller made up of three separate bearing pieces and includes a cage and a closure piece secured by a screw extending right through the crankshaft to prevent removal of the bearing pieces.

The present invention seeks to simplify the assembly of thread-on-type crankshafts and connecting rods.

BRIEF SUMMARY OF THE INVENTION

There is provided a crank in or for a thread-on-type crank and connecting rod assembly in which the bearing surfaces of the crankpin and big end constitute a race for a plurality of roller bearings, the roller bearings having radial, end bearing surfaces cooperating with annular bearing surfaces formed on the inner surfaces of the crank webs, in which an opening of greater diameter than the roller bearings is formed axially through one of the crank webs to communicate with the raceway to permit roller bearings to be loaded into the raceway therethrough. That opening is closed by a plug extending through the opening to the annular bearing surface of the web and the plug forms a part of the annular bearing surface of the web.

From another aspect there is provided the method of making the assembly which consists in forming an opening axially through one of the crank webs to communicate with the roller bearing raceway, locating a plug in that opening with its end projecting into the raceway grinding an annular bearing surface on that web about the crankpin and including the projecting end of the plug, and thereafter removing the plug and threading the big end of the connecting rod onto the crank pin and loading the roller bearings into the race way, the last few of the roller bearings being loaded through the opening in tee crank web that opening thereafter being closed by the plug.

Further characteristics of this invention will be apparent from the description of the drawings which follow.

BRIEF DESCRIPTION OF THE FIGURES OF THE DRAWINGS

Embodiments of the invention are illustrated in the accompanying drawings in which.

DESCRIPTION OF THE PREFERRED EMBODIMENT

Figure 1:
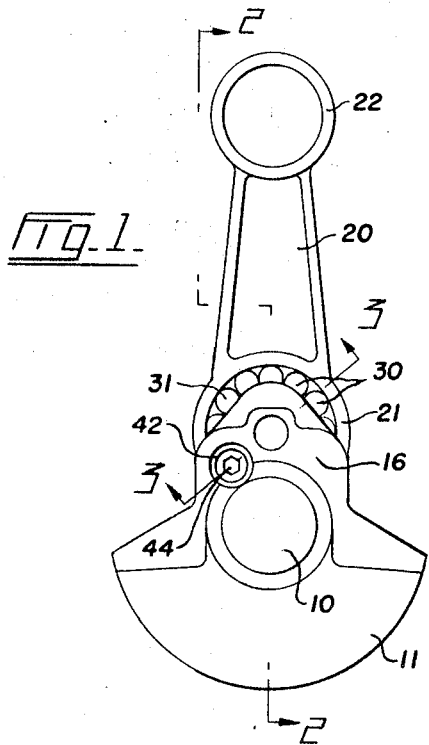
FIG. 1 is an end view of the crank and connecting rod assembly according to this invention.

The crank 10 is formed with an integral counterweight 11 and a removable counterweight 12 which is secured in position on the crankshaft by screws 13. Removal of the counterweight 12 allows the big end of the connecting rod to be threaded onto the crankpin 14 over the crank web 15. The other crank web 16 is formed integrally with counterweight 11.

The connecting rod 20 has a big end bearing 21 and a little end bearing 22, the little end being adapted to be located on the wristpin or gudgeon pin of a piston (not shown) and restrained against axial movement on that pin by the wrist pin bosses of the piston. The big end is of larger diameter than the crank pin and serves to accommodate a plurality of roller bearings 30 in the annular space between the bearing surfaces of the crankpin and the big end. Thus the bearing surfaces of the crankpin and the big end define a raceway for the roller bearings.

The side cheeks, or washers 17 and 18 of the crank web 15 and 16 support the roller bearings 30 against axial movement relative to the crankpin. They are ground to provide annular bearing surfaces around the crankpin for cooperation with the radial end bearing surfaces 31 of the roller bearings.

Most of the roller bearings can be loaded into the raceway between the big end bearing surface and the crankpin bearing surface by holding the big end eccentrically to the crankpin but the last few cannot be so loaded. To load the last few roller bearings a hole 40 is made through the crank web 16. The hole is drilled parallel to the axis of the crankpin and in such a position that the roller bearings can be loaded into the raceway. In other words the inner end of the hole communicates with the raceway. In this particular embodiment the hole is drilled so that the plane of the tangent to the radially innermost portion of the surface of the hole, i.e. the portion nearest to the crankpin axis, is also tangential to the crankpin bearing surface. Put another way, the radially innermost generatrix of the hole is coincidental with a generatrix of the crankpin bearing surface.

The hole 40 is counterbored as at 41 and the counterbored section is screw threaded for cooperation with a screw-threaded plug 42. The plug has a reduced diameter forward end 43 which is a close fit in the hole 40. The outer end of the plug has a hexagonal socket 44 for cooperation with an Allen key.

In making the assembly, the plug 42 is screwed tightly into the hole 40 until the shoulder at the transition from the threaded section of the plug to the forward end 43 abuts the shoulder formed in the counterbored hole 40. In this position the inner end of the plug projects beyond the inner face of the crank web 16, i.e. beyond the inner face of the washer 18. That innerface and the inner end of the plug are then ground to form a bearing surface for the axial end surfaces of the roller bearings. Thus the inner end surface of the plug 43 forms a part of an annular bearing surface on the inner surface of the crank web for supporting the rollers against axial movement relatively to the crankpin.

After the grinding operation the big end of the connecting rod is threaded along the crank shaft when the counterweight 12 has been removed and then over the web 15 and onto the crankpin 14. By holding the connecting rod eccentrically to the crankpin 14 some of the roller bearings can be loaded into the raceway constituted by the bearing surfaces of the crankpin and big end of the connecting rod. When no more roller bearings can be inserted in this way then the last few are inserted through the opening 40. When the raceway is fully loaded the plug 42 is screwed tightly into position to close the opening and so that the inner or forward end of the plug completes the annular bearing surface on the inner surface of the crank web 16.

To provide the proper end clearance for the bearings the region of the inner face of the crank web is recessed and correspondingly, the inner end of the plug is ground away so that only that portion of the inner end face of the plug which forms part of the inner bearing surface, remains.

Figure 2:
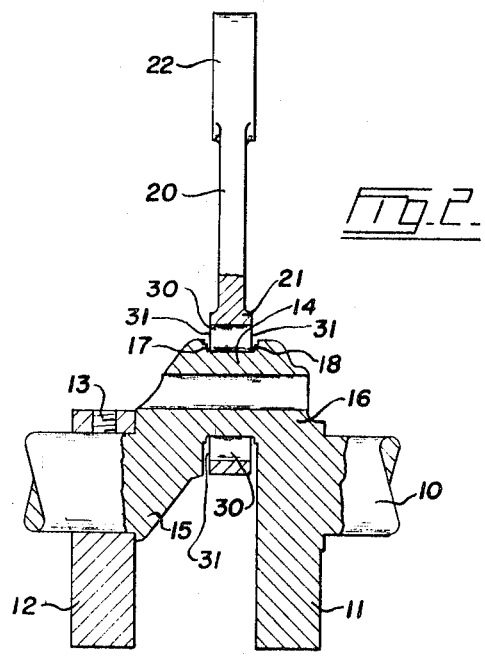
FIG. 2 is a side view of the embodiment of FIG. 1.

With such an arrangement it will be appreciated that as is shown in FIG. 2, the connecting rod has freedom for limited movement axially on the roller bearings but this is prevented by the wristpin bosses of the piston upon which the little end 22 of the connecting rod is mounted.

Figure 4:
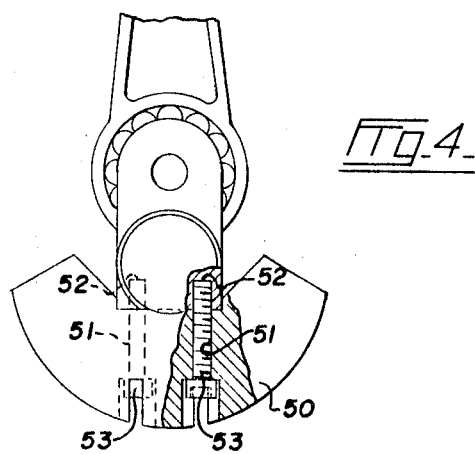
FIG. 4 is an end view of a different embodiment of the invention.

In FIG. 4 an alternative embodiment of the invention is illustrated in which only a part 50 of the counterweight is removable to facilitate threading the big end of the connecting rod onto the crankpin. Counterbored holes 51 are made in the part 50 and registering holes 52 are formed in the remainder of the counterweight. Holes 51 and 52 are screw threaded to enable the parts 50 to be secured in position by Allen screws 53.

Figure 3:
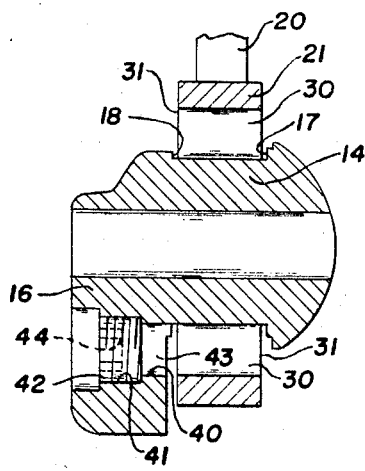
FIG. 3 is a section of the line 3-3 of FIG. 1 on a larger scale than FIG. 1.

The remaining parts of the embodiment of FIG. 4 are similar to those of the embodiment of FIGS. 1 to 3.

We claim:

1. A crank and connecting rod assembly of the thread on type, the crank having a crankshaft, crank webs secured to the shaft and supporting a crankpin eccentrically to the shaft and annular bearing surfaces formed on the crank webs around the crank pin to cooperate with end faces of roller bearings which are loaded into a space between the crankpin and a big end of the connecting rod when the assembly is made, wherein a roller bearing loading hole of greater diameter than the roller bearings is formed axially through one of the crank webs to admit roller bearings into the space between the crank pin and the big end.

2. An assembly as claimed in claim 1, in which the hole is counterbored and screw threaded along a part of its length to receive a correspondingly threaded plug, insertion of which closes said hole and completes the bearing surface of said one crank web.

3. An assembly as claimed in claim 2 in which the counterbored section is screw threaded.

4. A crank and connecting rod assembly as claimed in claim 1, in which the crank has a crankshaft, crank webs secured to the shaft and supporting a crank pin eccentrically to the shaft, and the connecting rod has a big end of substantially larger diameter than the crank pin to be threaded along the shaft and onto the crank pin, the big end and crankpin each having cylindrical bearing surfaces which together form a raceway for a plurality of roller bearings located therebetween, an annular radially extending bearing surface on each crank web around the crankpin providing end support for the roller bearings, an axial hole of greater diameter than the roller bearings extending through one of the crank webs and communicating with the raceway through which the roller bearings can be loaded into the raceway, and a plug removably located in the hole and having its inner end ground to form a part of the bearing surface on the crank web.

5. An assembly as claimed in claim 4 having counterweights on the shaft and in which at lest a part of one of the counterweights is removable to facilitate movement of the big end of the connecting rod along the shaft and onto the crank pin.

6. An assembly as claimed in claim 4 in which the hole is counterbored and screw threaded along a part of its length, the plug being correspondingly screw threaded.

7. An assembly as claimed in claim 6 in which the counter bored section of the hole is screw threaded.

8. An assembly as claimed in claim 4 in which the generatrix of the hole at the point closest to the crank pin axis coincides with a generatrix of the crank pin bearing surface.